INVENTOR.
YIGAL YANAI
BY
OSTROLENK, FABER, GERB & SOFFEN
ATTORNEYS

INVENTOR.
YIGAL YANAI
BY
OSTROLENK, FABER, GERB & SOFFEN
ATTORNEYS

United States Patent Office 3,344,278
Patented Sept. 26, 1967

3,344,278

DATA READOUT SYSTEM UTILIZING LIGHT SENSITIVE JUNCTION SWITCH MEMBERS

Yigal Yanai, Hollywood, Calif., assignor to International Rectifier Corporation, El Segundo, Calif., a corporation of California Filed June 14, 1963, Ser. No. 287,890
3 Claims. (Cl. 250—211)

ABSTRACT OF THE DISCLOSURE

A plurality of PNPN light activated switches having respective output load circuits are respectively energized by light passing through openings in a programming card. Each of the switches are connected to a saw tooth generator having a sufficiently high peak voltage to cause conduction of any of the switches if they are illuminated, with the saw tooth wave form synchronized with the motion of the data card. Each of the switches are built on a common wafer having a common P-type base with a bias cut extending from the outer surface of the uppermost layers of the switch.

My invention relates to a data readout system, and more specifically relates to a novel data readout circuit using PNPN light activated switch means which are driven by an oscillatory voltage.

There are many well known systems for data readout purposes which utilize photovoltaic elements which are actuated when a data carrying member having an opening or transparency or the like therein passes between the photovoltaic device and a light source. These existing systems generally have the limitations of very low power capacity, temperature sensitivity, low output voltage, and require additional amplifier systems.

The present invention provides a novel circuit which permits the use of a light activated PNPN switch which has high current capacity and a negligible temperature sensitivity below 75° C. Moreover, devices used in accordance with the invention can be operated from relatively high voltages, or voltages of the order of 400 to 500 volts, and, because of their switching action, do not require additional amplifiers. That is, the high switching currents can directly trigger printers or similar data recording systems.

In accordance with the invention, the light activated switches used in the data readout system are driven by an oscillatory wave form such as a sawtooth which is synchronized with the motion of the data carrying equipment such as a card feed. Thus, there will be a sufficient voltage across the switch to cause conduction of the switch if an illuminating signal occurs during the reading time. However, since the driving voltage has an oscillatory wave form, after the reading is completed, the voltage across the switch is reduced to below the holding current of the switch so that it will be turned off.

As a further feature of the invention, the individual PNPN switches are formed on a common P-type base so that a plurality of individual switches are available in a common module. This, of course, has the advantage of simplicity of mounting, and has the advantage of inherently having close spacing between the individual switches to correspond to the close spacing of punched information in data carrying cards or tape.

Accordingly, a primary object of this invention is to provide a data readout system which can use PNPN-type activated switches.

Another object of this invention is to provide a novel data readout system which has high current capacity and low temperature sensitivity.

Yet another object of this invention is to provide a novel light actuated data readout circuit which does not require additional amplifiers for triggering a data recording system.

These and other objects of my novel invention will become apparent from the following description when taken in connection with the drawings, in which:

FIGURE 1 schematically illustrates a perspective view of a data carrying card or the like which is interposed between data reading light actuated devices and a light source.

Figure 1:
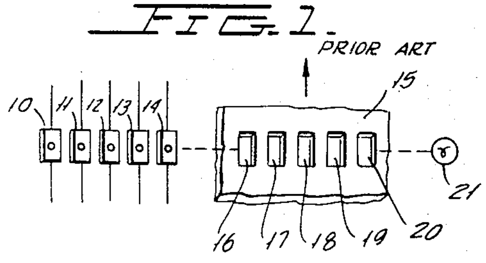

Referring first to FIGURE 1, I have schematically illustrated therein a typical data readout system wherein a plurality of light sensitive elements 10 through 14 are positioned below the path of travel of a data carrying card 15. The card 15, for example, carries data in the form of punched holes 16 through 20 which are in a position to be aligned with light sensitive elements 10 through 14 respectively.

An appropriate light source 21 is then positioned in such a manner that when an opening or equivalent transparency appears in the card 15, its respective light actuated device will be activated, as indicated, for example, by the dotted lines extending from source 21 through opening 20 to element 14. Clearly, any number of positions could be utilized, and five are shown in FIGURE 1 for purposes of illustration.

Once an opening in the card passes its respective light-sensing unit, the unit will be activated so that, for example, it will subsequently activate a recording system, or the like.

Figure 2:
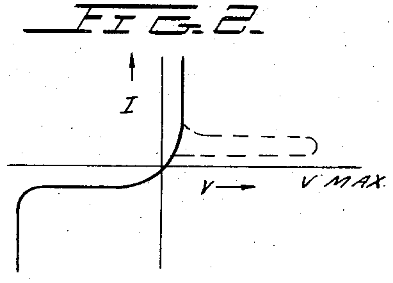
FIGURE 2 shows the well known characteristics of a PNPN light actuated switch.

In the past, PNPN light activated switch devices could not be used for data readout circuit purposes. FIGURE 2 illustrates the characteristics of these devices where the dotted line indicates the dark characteristics of the cell, while the solid line indicates the illuminated characteristics of the cell. Thus, assuming that some positive voltage is applied across a dark cell which is below the value $V_{max}$, substantially no current will flow. Once, however, the cell is illuminated, this same voltage will permit a substantial current to flow.

It is a characteristic of such devices that after the cell is "fired" by illumination, a removal of the illumination will not stop current flow. In order to stop the current flow in such a device, it is necessary to remove the forward voltage. Therefore, had such units been used in the system such as that of FIGURE 1, once the cell is illuminated and begins to conduct, it would not turn off after the illumination is removed.

Figure 3:
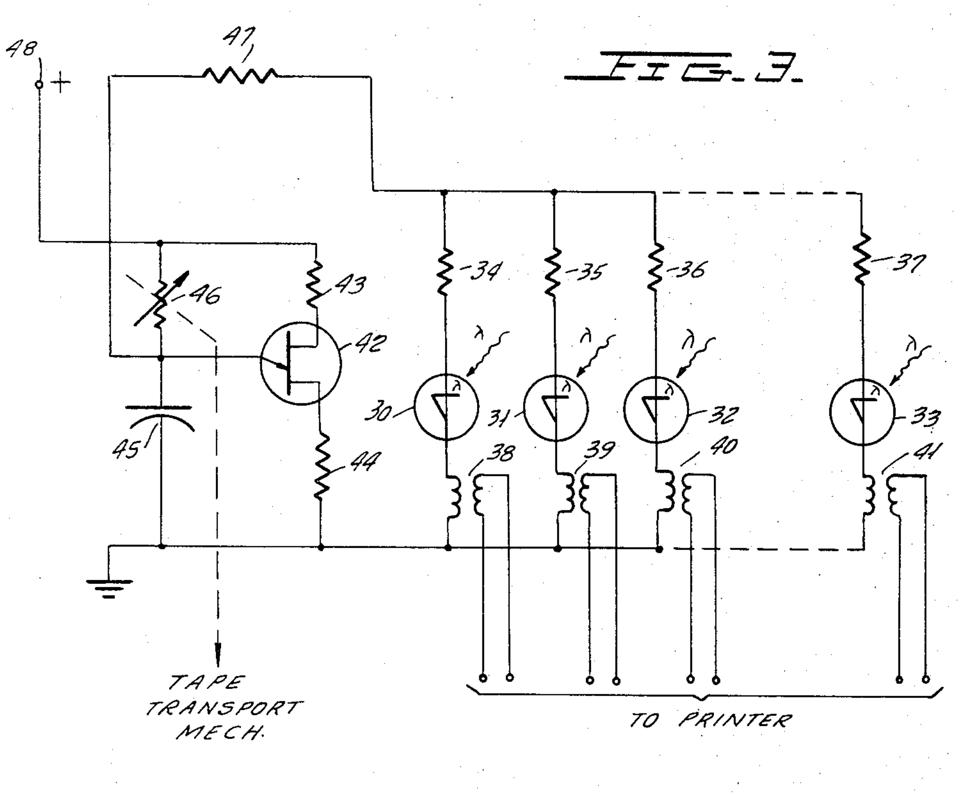
FIGURE 3 shows the novel circuit of the invention which permits the use of PNPN light actuated switches in a data readout system of the type of FIGURE 1.

In accordance with the invention, and as illustrated in FIGURE 3, the cells are driven by an oscillatory voltage such as a sawtooth which is synchronized with the movement of the card or other data carrying member. Thus, a sufficient firing voltage is available should there be illumination during the data reading interval. This voltage decreases to zero after the data reading interval so that the cell may be extinguished if previously fired, and thus is prepared for a subsequent reading operation.

More specifically, FIGURE 3 schematically illustrates a plurality of side-by-side positioned PNPN light activated switches 30, 31, 32 and 33. As indicated by the dotted line break between cells 32 and 33 any number of cells could be used.

Each of cells 30, 31, 32 and 33 are connected in series with resistors 34 and 37 respectively which may be 100 ohm resistors, and the primary winding of transformers 38 through 41 respectively. The secondary windings of transformers 38 through 41 may then, as indicated, be taken to a printer or other suitable data recording system without the need for additional amplifiers or the like, but in a direct connection.

Each of switches 30 through 33 are then biased by means of a sawtooth generator circuit which includes a unijunction transistor 42 which is connected in an oscillator circuit which includes resistors 43 and 44 which may be 100 ohms and 50 ohms respectively, capacitor 45 which may be 0.2 microfarad, and a potentiometer 46 which controls the sawtooth frequency and which may be a 10K potentiometer.

The junction between potentiometer 46 and capacitor 45 is then connected through resistor 47 which may be a 47-ohm resistor, and then to the light activated switch circuit. The other side of the light activated switch circuit is then connected to ground, as indicated, and a positive input voltage is connected to terminal 48 to drive the oscillator and could, for example, be 20 volts with respect to ground.

Figure 4:
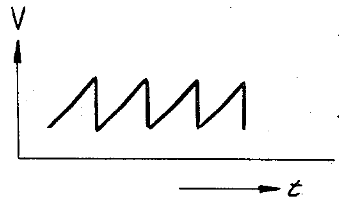
FIGURE 4 illustrates the waveshape of the driving voltage for the light activated switches of FIGURE 3.

The output waveshape of the oscillator of FIGURE 3 is illustrated in FIGURE 4, and is a typical sawtooth. Clearly, other oscillatory wave forms such as pulses or the like could be used.

The frequency of the sawtooth wave of FIGURE 4 is synchronized with the speed of the data carrying member 15 of FIGURE 1 in such a manner that when there is a possibility that openings in the card or tape will register with the switch devices, the sawtooth voltage will be relatively high. Thus, there will be a firing voltage available if one or more of the switch elements are illuminated.

After this reading time has passed, the sawtooth decreases to a relatively low value which is sufficient to extinguish any switch which has been previously illuminated. Thereafter, and when the next possible reading interval occurs, the next peak of the sawtooth will be applied to the switches.

In order to appropriately synchronize the sawtooth driving voltage with the movement of the data carrying member such as data carrying member 15 of FIGURE 1, the potentiometer 46 which controls the sawtooth frequency may be connected to the tape transport mechanism through an appropriate servo system whereby the sawtooth frequency is always synchronized with the speed of the data carrying member.

The individual switches, as shown in FIGURE 1, cause considerable mounting difficulty and take up considerable space after mounting, which limits the number of adjacent lines of punching which could be used in the data carrying member.

Figure 5:
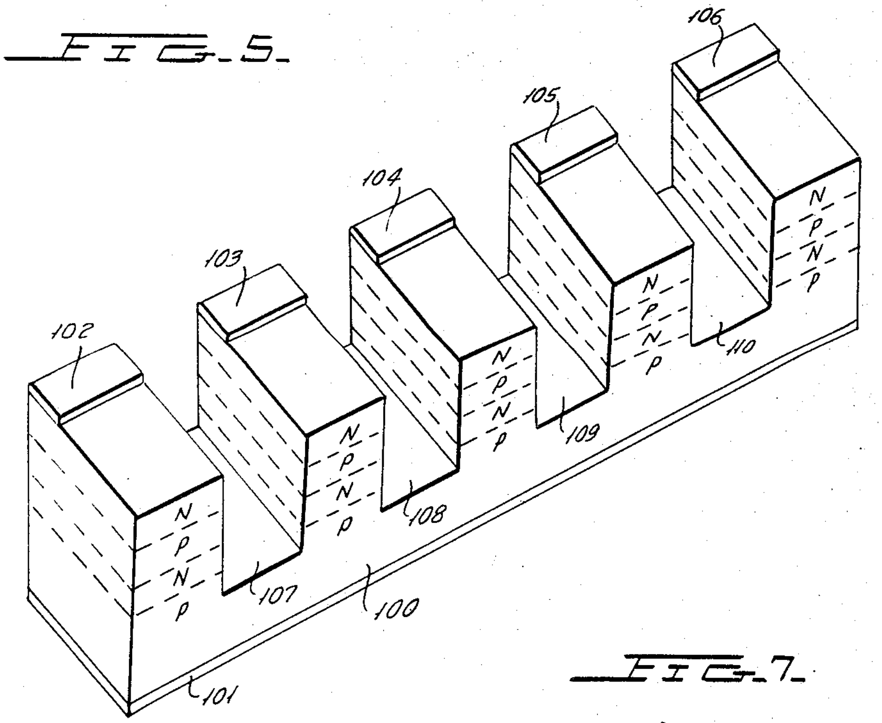
FIGURE 5 illustrates a first embodiment of a module arrangement for the individual switches of the invention.

As a further feature of the present invention, the individual switches are formed in a module-type arrangement, as illustrated in FIGURE 5.

Referring now to FIGURE 5, I have illustrated a module which forms five individual PNPN light activated switches which are inherently closely spaced to one another so that the lines of information in a corresponding data carrying member can be similarly closely spaced.

The module of FIGURE 5 is more specifically formed of a wafer of semiconductor material such as silicon or any other appropriate material. The module could have a total thickness, for example, of 40 mils and a depth, for example, of 40 mils. The length of the module will, of course, be determined solely by the number of individual switches which are to be provided where the length of each of the switches could be 20 mils with the spacing between switch elements of another 20 mils.

This type wafer may be formed by any well known process. Thus, the wafer may be appropriately treated so that it will have a first P-type layer 100 followed by an N-type, a P-type layer and an N-type layer. After the formation of the wafer, an electrode 101 which could, for example, be of tin is suitably applied to the bottom of the wafer, as illustrated, while a second electrode which could also be of tin is applied to the upper rearwardly disposed surface.

As will be seen more fully hereinafter, this upper electrode, after etching, is divided into the five individual electrodes 102, 103, 104, 105 and 106.

After the application of electrodes, the unit is appropriately masked and an etching operation is performed to etch away material or otherwise suitably remove material from regions 107, 108, 109 and 110. Thus, the removal of material is such that there is a separation between the upper three layers of each of the sections formed with the etching stopped to retain the common P-type base layer. By way of example, five separate devices are formed in FIGURE 5 where the upper N-type layer of each of the devices has a depth of 5 mils, the next lower P-type layer has a depth of 10 mils; the next lower N-type layer has a depth of 10 mils; while the depth of the etch area below the last N-region extends into the lowermost P-region for about 5 mils. The module of FIGURE 5 may be finished in accordance with any standard well known practice wherein the surfaces are subjected to appropriate passivation techniques after etching with the light-sensitive front surfaces being masked during passivation.

Figure 7:
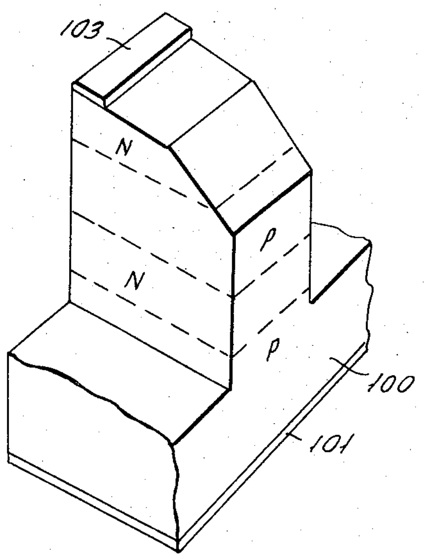
FIGURE 7 illustrates one manner in which the individual switches of the module of FIGURE 5 may be modified to render them more sensitive to illumination.

The completed module, whether of the type of FIGURE 5 or FIGURE 7 is thereafter appropriately hermetically sealed and is then appropriately hermetically sealed with a glass cover plate to permit introduction of illumination to the sensitive surfaces. This hermetically sealed unit may then be handled as a complete unit, whereby ease of installation and maintenance of the row of readout elements is insured, as contrasted to the prior requirements for handling and maintaining individual readout elements.

Clearly, the module manufactured in accordance with FIGURE 5 will define five individual light activated PNPN switches corresponding to the five switches of FIGURE 1.

Figure 6:
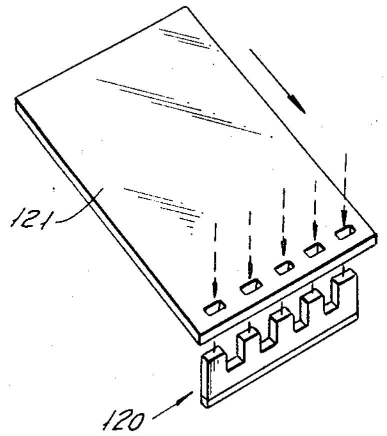
FIGURE 6 illustrates the manner in which the module is arranged with respect to an information carrying card or tape.

The module of FIGURE 5 may then be used as illustrated in FIGURE 6 by module 120, which is positioned between a source of illumination represented by the arrows and an information carrying card or tape 121. Openings in the card appear along lines which are in registry with the individual switch elements of module 120.

It is to be noted that where the module of FIGURE 5 is used in the circuit of FIGURE 3, the transformers 38, 39, 40 and 41 would be connected between resistors 34 through 37 and the switch members 30 through 33 respectively, whereby the switch members will have a common lower terminal corresponding to electrode 101 of FIGURE 5 which is connected to ground.

One manner in which the switches of FIGURE 5 may be increased in sensitivity is illustrated in FIGURE 7 for one of the switches of the module. Thus, in FIGURE 7 it will be seen that a bias cut 125 is made in the surface of the uppermost N-type layer and extends through the junction 126 formed by this uppermost N-type layer and the P-type layer immediately therebelow. With the bias cut formed in this manner, the junction 126, which is the most sensitive portion of the switching element, is more directly exposed to incident radiation whereby switch operation is substantially improved. Clearly, the bias cut surface will also be masked during a passivation process after the production of the element.

Although this invention has been described with respect to preferred embodiments thereof, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A data readout system comprising means operable in a predetermined sequence, a plurality of PNPN light activated switch members aligned in a predetermined manner to be repetitively illuminated or non-illuminated in accordance with said predetermined sequence, an energizing circuit for each of said PNPN light activated switch members, and a respective output circuit connected in series with each of said light activated switch members; said energizing circuit including a source of oscillatory voltage having a peak voltage sufficient to render any of said switches conductive only when illuminated and a minimum voltage sufficiently low to render a conductive switch non-conductive; said oscillatory voltage having a frequency synchronized with said means operable in a predetermined sequence; said energizing circuits being respectively connected in series with each of said switches and their said respective output circuits; said plurality of PNPN switches being immediately adjacent one another and lying along a row; said switches having a common P base region with a common terminal secured thereto; said common P base region having separate sequentially arranged N, P and N layers thereon to define each of said switches; the uppermost of said N layers having a respective electrode thereon to define the other terminal of each of said switches.

2. The system of claim 1 wherein said oscillatory voltage source comprises a sawtooth generator.

3. The system of claim 1 wherein each of said switches is separated by a bias cut extending from the top of the uppermost of each of said N layers and through the junction formed between said P base region and the N layer adjacent thereto.

References Cited

UNITED STATES PATENTS

| | | | |
|---|---|---|---|
| 2,886,739 | 5/1959 | Matthew et al. | 250—211 |
| 2,959,681 | 11/1960 | Noyce | 250—211 |
| 2,985,805 | 5/1961 | Nelson | 317—235.27 |
| 3,064,132 | 11/1962 | Strull | 250—211 |
| 3,202,824 | 8/1965 | Yando | 250—219 X |
| 3,210,548 | 10/1965 | Morrison | 250—211 |
| 3,270,235 | 8/1966 | Loebner | 250—211 |

WALTER STOLWEIN, *Primary Examiner.*